(12) United States Patent
Ma et al.

(10) Patent No.: US 10,425,344 B2
(45) Date of Patent: Sep. 24, 2019

(54) AVOIDING DROPPED DATA PACKETS ON A NETWORK TRANSMISSION

(71) Applicant: Avago Technologies International Sales Pte. Limited, Singapore (SG)

(72) Inventors: Taufik Tuan Ma, Portland, OR (US); Mark J. Karnowski, Huntington Beach, CA (US); Brandon Hoff, Cherry Hills Village, CO (US)

(73) Assignee: Avago Technologies International Sales Pte. Limited (SG)

( * ) Notice: Subject to any disclaimer, the term of this patent is extended or adjusted under 35 U.S.C. 154(b) by 142 days.

(21) Appl. No.: 14/975,705

(22) Filed: Dec. 18, 2015

(65) Prior Publication Data
US 2017/0180261 A1   Jun. 22, 2017

(51) Int. Cl.
*H04L 12/825* (2013.01)
*H04L 12/801* (2013.01)
*H04L 12/835* (2013.01)
*H04L 5/00* (2006.01)
*H04L 1/00* (2006.01)
*H04L 1/16* (2006.01)

(52) U.S. Cl.
CPC .......... *H04L 47/25* (2013.01); *H04L 5/0055* (2013.01); *H04L 47/11* (2013.01); *H04L 47/12* (2013.01); *H04L 47/30* (2013.01); *H04L 1/0002* (2013.01); *H04L 1/1671* (2013.01)

(58) Field of Classification Search
CPC ....... H04L 47/25; H04L 5/0055; H04L 47/30; H04L 47/12; H04L 47/11
See application file for complete search history.

(56) References Cited

U.S. PATENT DOCUMENTS

| 5,303,302 | A | * | 4/1994 | Burrows | H04J 3/0632 370/412 |
| 6,490,279 | B1 | * | 12/2002 | Chen | H04L 12/56 370/392 |
| 7,742,412 | B1 | * | 6/2010 | Medina | H04L 47/11 370/231 |
| 2002/0126673 | A1 | * | 9/2002 | Dagli | H04L 47/10 370/392 |
| 2003/0131119 | A1 | * | 7/2003 | Noonan | H04L 41/00 709/232 |
| 2005/0073956 | A1 | * | 4/2005 | Moores | H04L 47/20 370/235 |

(Continued)

*Primary Examiner* — Christine Ng
(74) *Attorney, Agent, or Firm* — Sheridan Ross P.C.

(57) ABSTRACT

A method, system, and apparatus are provided to avoid dropping data packets between computers coupled on a network. In one example, the system receives a plurality of data packets from one or more sending servers into a receive queue of a first network interface device (e.g., Fiber Channel host bus adapter) in a receiving server. The receive queue includes addresses to data buffers to store a predetermined number of data packets. The system monitors the number of data packets stored in the data buffers waiting for read out by a software application. The system detects a potential overflow of the receive queue in response to a number of unused data buffers of the receive queue. In response to detecting the potential overflow, the system performs pre-emptive actions to avoid dropping at least one of the plurality of data packets.

22 Claims, 13 Drawing Sheets

(56) References Cited

U.S. PATENT DOCUMENTS

| | | | |
|---|---|---|---|
| 2005/0249204 A1* | 11/2005 | Saado | G06F 13/124 370/389 |
| 2008/0119183 A1* | 5/2008 | Kono | H04W 36/0066 455/432.1 |
| 2008/0225715 A1* | 9/2008 | Plamondon | H04L 1/0025 370/232 |
| 2009/0141630 A1* | 6/2009 | Denzel | H04L 43/0882 370/235 |
| 2015/0043337 A1* | 2/2015 | Kanamarlapudi | H04W 72/1252 370/230 |

* cited by examiner

METHOD 900

FROM FIG. 6

ALLOCATE MORE ADDRESSES TO MORE BUFFERS FOR THE QUEUE TO ENABLE THE APPLICATION TO STORE MORE DATA PACKETS — 905

END

AVOIDING DROPPED DATA PACKETS ON A NETWORK TRANSMISSION

FIELD

The embodiments relate generally to a network adapter approach to avoiding dropped data packets on a network transmission.

BACKGROUND

Communication traffic in today's Ethernet computer communication networks, including local area networks (LANs) and wide area networks (WANs), are predominantly occupied by Transmission Control Protocol/Internet Protocol (TCP/IP) packets. TCP/IP transport relies on a sophisticated retransmit algorithm of TCP/IP packets in the network to handle dropped TCP/IP packets that were transmitted but never acknowledged as being received. However, retransmitted TCP/IP packets lead to poor network utilization (lower bandwidth efficiency) and higher latencies.

While packet drops are commonplace in a WAN, packet drops can also occur in a LAN within a data center due to an increasing level of inter-server packet traffic between servers within the data center (e.g., east-west traffic). The inter-server packet traffic can be so high that it sometimes overflows the data buffers of the data center's switches and routers within the LAN. Accordingly, the switches and routers will drop packets for TCP/IP packet traffic.

Furthermore, dropped data packets can occur at receiving servers within a data center that are receiving a transmission of data packets from a sending server. For some reason, the receiving server cannot process or store the received data packets at the transmission rate of the sending server. Dropped packets by the receiving server can further lead to poor network utilization of the network and added network latency between servers.

BRIEF SUMMARY

The embodiments are summarized by the claims that follow below. Briefly, however, a method, system, and apparatus for avoiding dropped data packets on a network transmission are provided. In one example, the system receives a plurality of data packets from one or more sending servers into a receive queue for a first network interface device (e.g., Fibre Channel host bus adapter) of a receiving server. The receive queue includes addresses to data buffers that store a predetermined number of data packets. The system monitors the number of data packets stored in the data buffers waiting for read out by a software application. The system detects a potential overflow of the receive queue in response to a predetermined number of unused data buffers associated with the queue. In response to detecting the potential overflow of the receive queue, the system performs preemptive actions to avoid dropping at least one or more of the plurality of data packets.

The network interface adapter (e.g., Fibre Channel host bus adapter) can initiate at least three preemptive actions to avoid dropping data packets: (1) return an explicit congestion notification (ECN) to the sending server; (2) increase the receive queue depth for a congested application running on the receiving server; and/or (3) increase processor resources for the application running on the receiving server to more expediently process the received packets.

BRIEF DESCRIPTIONS OF THE DRAWINGS

Various embodiments are illustrated by way of example, and not by way of limitation, in the figures of the accompanying drawings, in which.

It will be recognized that some or all of the figures are for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION

In the following detailed description of the embodiments, numerous specific details are set forth. However, it will be obvious to one skilled in the art that the embodiments may be practiced without these specific details. In other instances well known methods, procedures, components, and circuits have not been described in detail so as not to unnecessarily obscure aspects of the embodiments.

A method and system are provided for avoiding dropped data packets on a network transmission between computers. In particular, a network interface adapter (e.g., Fibre Channel host bus adapter) is provided on a server for avoiding dropped data packets.

Figure 1:
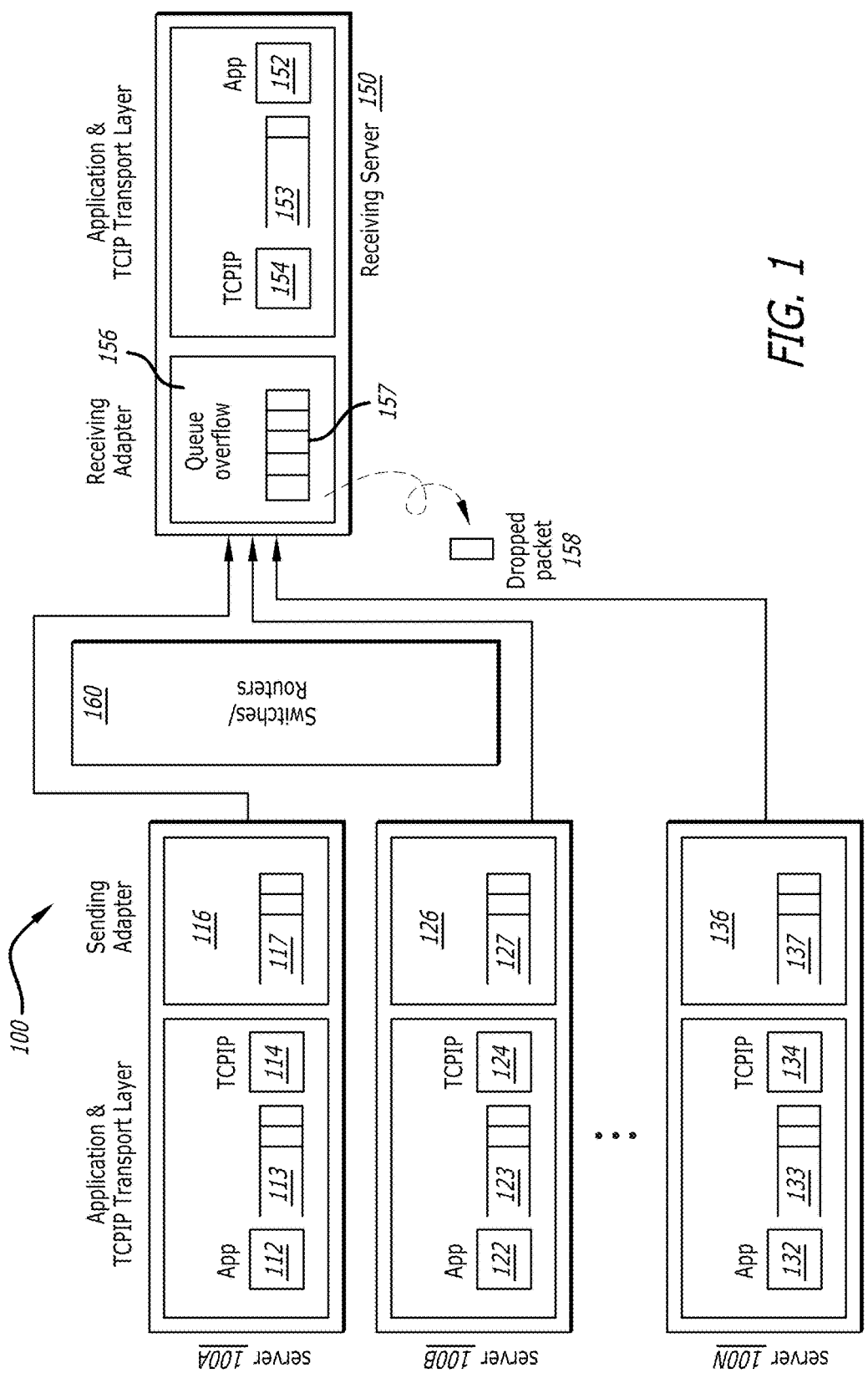
FIG. 1 is a conceptual diagram of an example system for transmitting data packets between computers.

FIG. 1 is a conceptual diagram of an example system 100 for transmitting data packets between computers. The system 100 includes a receiving server 150 coupled to sending servers 100A-100N over a network that includes switches/routers 160.

Each of the sending servers 100A-100N includes without limitation (1) a layer for applications and TCP/IP transport and (2) a sending adapter. For example, an application 112 is running on server 100A. The application 112 uses a queue 113 for transmitting data packets via a TCP/IP layer 114 to a queue 117 of a sending adapter 116. Likewise, an application 122 is running on server 100B. The application 122 uses a queue 123 for transmitting data packets via a TCP/IP layer 124 to a queue 127 of a sending adapter 126. Likewise, an application 132 is running on server 100N. The application 132 uses a queue 133 for transmitting data packets via a TCP/IP layer 134 to a queue 137 of a sending adapter 136.

The receiving server 150 includes without limitation (1) a receiving adapter and (2) a layer for applications and TCP/IP transport. For example, the receiving server 150 includes a receiving adapter 156 having a queue 157 that receives data packets sent from the sending servers. An application 152 is running on the receiving server 150. The application 152 uses a queue 153 for receiving data packets via a TCP/IP layer 154 from the queue 157 of the receiving adapter 156.

The following description includes the following: an explanation of how a system incurs dropped packets; a switch/router for avoiding dropped packets by using a switch/router; and a network interface device (e.g., Fibre Channel host bus adapter) for avoiding dropped packets.

How a System Incurs Dropped Data Packets

Referring again to FIG. 1, on the receiving server 150, a slow application 152 or slow TCP/IP layer 154 backs up the queue 157 of the receiving adapter 156. The receiving adapter 156 has nowhere to store incoming data packets once the queue 157 reaches capacity. The receiving adapter 156 drops (e.g., "tail-drops") incoming data packets on an overflow of the queue 157.

The sending server (e.g., server 100B) eventually detects the dropped data packet via TCP timers. For example, the sending server sends frames of data packets. At a certain frame count (e.g., frame number 47), the receiving server 150 sends an acknowledgement (ACK) packet back to the sending server. The sending server is awaiting the ACK packet, which should come into the receiving server at a known bit rate. If the ACK packets are being received slower than expected, then the sending server reduces (e.g., throttles) the transmit rate of data packets by reducing the size of a TCP window for data packet transmits. The TCP window is the number of bytes that can be sent out before receiving an acknowledgement (ACK) data packet from the receiving server 150. The sending server retransmits the dropped data packet. Unfortunately, application performance suffers due to latency caused by data packet drops and retransmits.

Switch/Router for Avoiding Dropped Packets

In an effort to avoid dropped packets, a standards committee for TCP/IP has added an Explicit Congestion Notification (ECN) capability to TCP's three way handshaking technique, which is often referred to as "SYN-SYN-ACK". The ECN capability helps the switch/server 160 to avoid dropping data packets.

For the example, if the buffer of switch/router 160 of FIG. 1 reaches a threshold congestion level (but ideally before the switch/router 160 needs to drop packets), then the switch/router 160 can take preemptive actions by sending a congestion notification with a TCP packet from the switch/router to the receiving server 150. In one implementation, the switch/router 160 tags a data packet with a bit that represents the congestion notification. The receiving server 150 reflects the congestion notification back to the sending server by setting an ECN echo flag (e.g., an ECN echo bit) in the next TCP acknowledgement (ACK) packet. The sending server (e.g., server 100B) receives the ACK packet and responds by slowing down (e.g., throttling) the transmit rate of data packets by reducing the size of a TCP window for data packet transmits. The slow down precludes overflowing the buffers of the switch/router 160 buffers and avoids dropped packets 158. The technique for getting the congestion notification back to the sending server may be referred to as "forward ECN".

Network Interface Adapter for Avoiding Dropped Packets

It is often advantageous for a network interface device on a receiving server to initiate preemptive actions to prevent dropped packets. In particular, managing congestion by using a network interface adapter is advantageous when an application or its TCIP/IP transport layer, running on the receiving server, is not fast enough to keep up with the data packets being received. Accordingly, a network interface adapter on a receiving server is directly configured to solve the problem of dropped packets at the network interface adapter, as opposed to a switch/router.

An application running on the receiving server may be too slow for various reasons (e.g., poorly written, insufficient processor and memory resources due to virtualization of the application and its TCP/IP transport layer, etc.). Typical and undesirable behavior of the network interface adapter within the receiving server is to drop packets once the adapter's buffers have reached their limit since the application is not clearing those buffers. The dropped packets have the detrimental effect of poor utilization and latency in the network.

As further described below, the network interface adapter can initiate at least three preemptive actions to avoid dropping data packets: (1) return an explicit congestion notification (ECN) to the sending server; (2) increase queue depth for a congested application running on the receiving server; and/or (3) increase processor resources for the application running on the receiving server.

Avoiding Dropped Data Packets by Returning an Acknowledgement Packet

To address the problem of dropped packets, a network interface adapter is provided that can send an explicit congestion notification (ECN) back to the sending server, as the queues for the network interface adapter approach their limits. For example, the receiving server can send an acknowledgement (ACK) packet with an explicit congestion notification (ECN) echo flag (e.g., an ECN echo bit) to the sending server. This technique for congestion notification is similar to the technique used for switches/routers, as described above with reference to FIG. 1. However, in this case, the ECN originates at the receiving adapter 157, instead of the switch/router 160.

Figure 2:
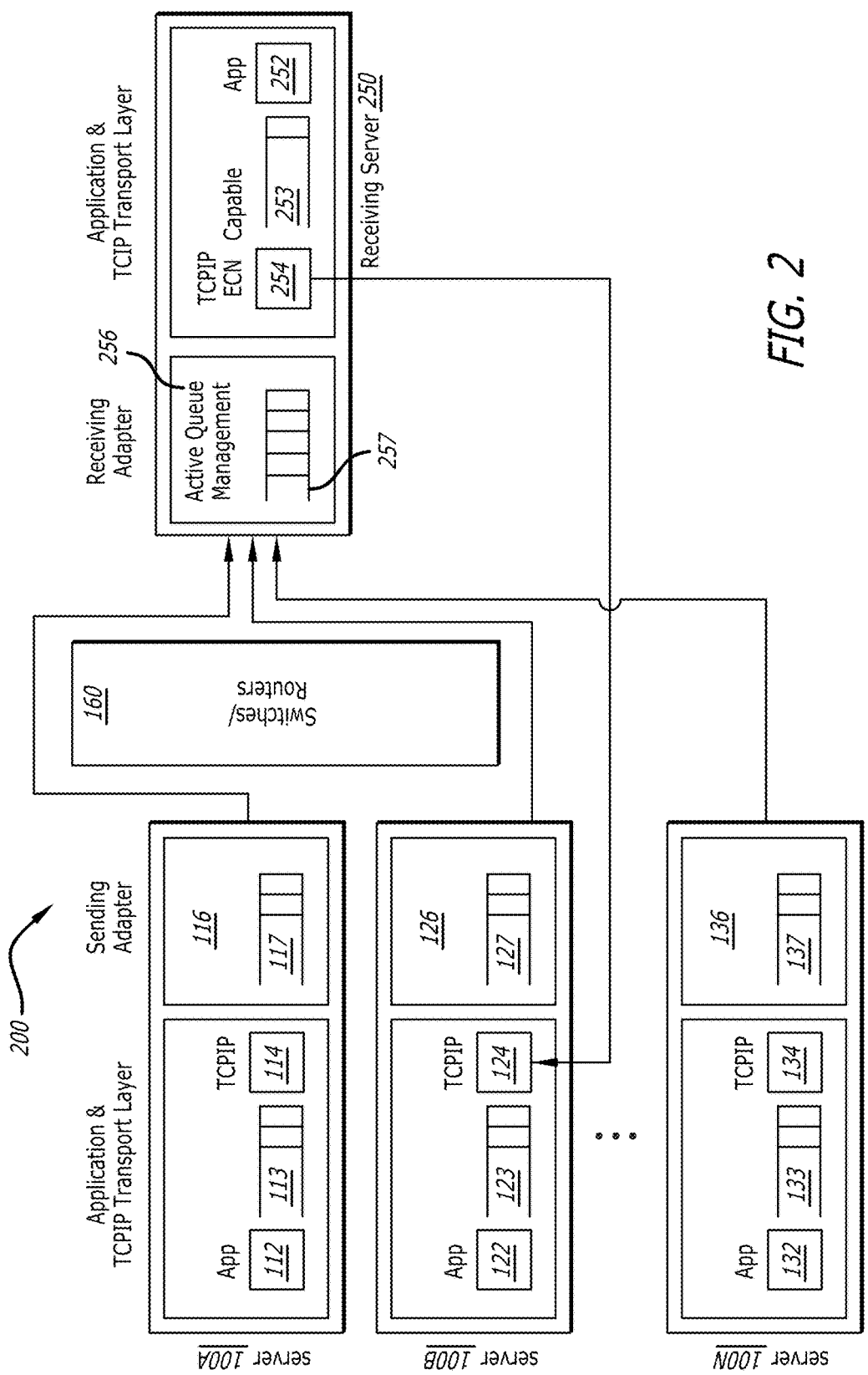
FIG. 2 is a conceptual diagram of an example system for avoiding dropped data packets by using the receiving adapter (e.g., network interface adapter).

FIG. 2 is a conceptual diagram of an example system 200 for avoiding dropped data packets by using the receiving adapter 156 (e.g., network interface adapter). The system 200 includes a receiving server 250 coupled to sending servers 100A-100N over a network that includes switches/routers 160, which are discussed above with reference to FIG. 1.

The receiving server 250 includes without limitation (1) a receiving adapter and (2) a layer for applications and TCP/IP transport. For example, the receiving server 250 includes a receiving adapter 256 (e.g., network interface adapter) having a queue 257 that receives data packets sent from the sending servers. An application 252 is running on the receiving server 250. The application 252 uses a queue 253 for receiving data packets via a TCP/IP layer 254 from the queue 257 of the receiving adapter 256.

On the receiving server 250, a slow application 252 or slow TCP/IP layer 254 backs up the queue 257 of the receiving adapter 256. The queue 257 is potentially overflowing. Instead of dropping packets, the receiving adapter 256 can perform active queue management and initiate preemptive actions to prevent dropped packets. For example, the preemptive actions include monitoring a queue depth of the queue 257 and detecting a potential overflow (e.g., number of unused buffers for the queue 257 has dropped to a threshold level). In response to the potential overflow, the TCP/IP layer 254 sets an ECN echo bit in an acknowledgement (ACK) packet. The receiving server 250 sends the acknowledgment packet with the ECN echo bit back to the sending server (e.g., server 100B). The sending server receives the ACK packet and reacts by slowing down the transmit rate of data packets. The sending server reduces (e.g., throttles) the transmit rate of data packets by reducing the size of a TCP window for data packet transmits. The TCP window is the number of bytes that can be sent out before receiving an acknowledgement (ACK) data packet from the receiving server 250.

Every data packet that the receiving adapter 256 avoids dropping is a data packet that a sending server does not have to retransmit. Fewer retransmits is directly associated with less latency, higher utilization of data packets, higher application performance, and better overall performance in the system 200.

Figure 3:
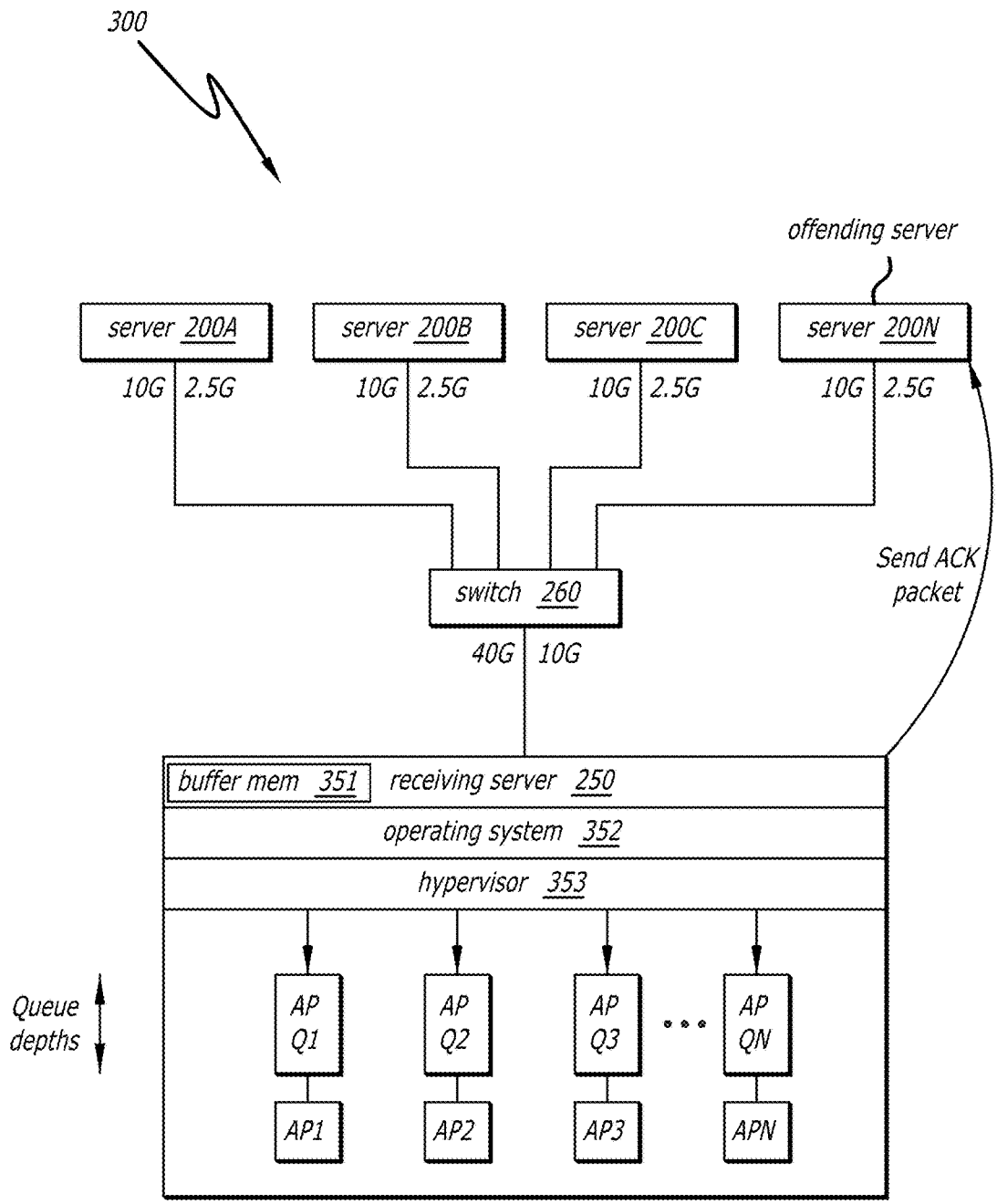
FIG. 3 is a conceptual diagram of another example system for avoiding dropped data packets by using the receiving adapter (e.g., network interface adapter).

FIG. 3 is a conceptual diagram of another example system 300 for avoiding dropped data packets by using the receiving adapter 156 (e.g., network interface adapter). FIG. 3 is provided to show more details of active queue management carried out on the receiving server 250. For simplicity, devices introduced for FIGS. 1 and 2 are not reintroduced for FIG. 3.

The receiving server 250 further includes a buffer memory 351, an operating system 352, and a hypervisor 353 coupled to each other. The operating system 352 includes software modules that are configured to run on the receiving server 250. The operating system 352 manages computer hardware and software resources of the receiving server 250 and provides common services for computer programs that may be managed by the hypervisor 353.

The hypervisor 353 includes computer hardware, software, or firmware that generates and runs virtual machines. In one implementation, applications AP1-APN running on the receiving server 250 are virtual machines that are virtually coupled to the hypervisor 353. Accordingly, the receiving server 250 may be referred to as a host machine. Each virtual machine (e.g., each application AP1-APN) may be referred to as a guest machine having a guest operating system. The hypervisor 353 presents the guest operating systems with a virtual operating platform and manages the execution of the guest operating systems.

The receiving server 250 shares the buffer memory 351 among all of the applications AP1-APN via queues Q1-QN. For example, the hypervisor 353 manages a virtualization of the buffer memory 351 and manages sharing the buffer memory 351 among the applications AP1-APN. The hypervisor 353 controls a device driver for the receiving adapter 257 (see FIG. 2) and controls routing of data packets into queues Q1-QN for applications AP1-APN, respectively. In one implementation, the hypervisor 353 presents an Ethernet driver to each application AP1-APN and routes the Ethernet driver to a device driver for the receiving adapter 257. The device driver for the receiving adapter 257 manages the hardware environment of the receiving adapter 257.

The receiving server 250 monitors the number of data packets each application AP1-APN stores in the buffer memory 315 by monitoring the depth of each queue Q1-Q. Instead of dropping packets, the receiving server 250 can perform active queue management and initiate preemptive actions to prevent dropped packets. For example, the preemptive actions include monitoring a queue depth of each queue Q1-QN and detecting a potential overflow (e.g., number of unused buffers for a queue has dropped to a threshold level).

The receiving server 250 can calculate a threshold level for a potential overflow based on the size of each queue reserved for each application AP1-APN. Consider, for example, four sending servers share a 40-Gbit link through a network interface adapter (e.g., receiving adapter 257 of FIG. 2) on the receiving server 250. The receiving server 250 may initially allocate 10-Gbit of buffer memory 351 for each queue Q1-QN. Queue Q1 may drop to a predetermined threshold level of unused buffers (e.g., 25% unused buffers or some other percentage). Reaching the threshold level represents a potential overflow. The receiving server 250 is aware which sending server and which sending application are associated with queue Q1. In the example of FIG. 3, a sending application running on server 100N is associated with queue Q1 and the potential overflow. Accordingly, server 100N may be referred to as the "offending server".

In response to the potential overflow, the TCP/IP layer 254 sets an ECN echo bit in an acknowledgement (ACK) packet. The receiving server 250 sends the acknowledgment packet with the ECN echo bit back to the offending sending server (e.g., server 100N in FIG. 3). The offending sending server receives the ACK packet and reacts by slowing down the transmit rate of data packets. The offending sending server reduces (e.g., throttles) the transmit rate of data packets by reducing the size of a TCP window for data packet transmits. The TCP window is the number of bytes that can be sent out before receiving an acknowledgement (ACK) packet from the receiving server 250.

When there are multiple offending sending servers (e.g., multiple applications congested at the receiving server), the receiving server 250 can prioritize the preemptive actions for slowing down transmits. For example, the receiving server 250 identifies the offending sending server that has the most congested queues, and then sends an ACK packet (with an activated ECN echo bit) to that offending sending server first. The receiving server 250 can continue in this manner, identifying the sending server that is the most offending and then sending an ACK packet (with an activated ECN echo bit) to that offending sending server.

Figure 4A:
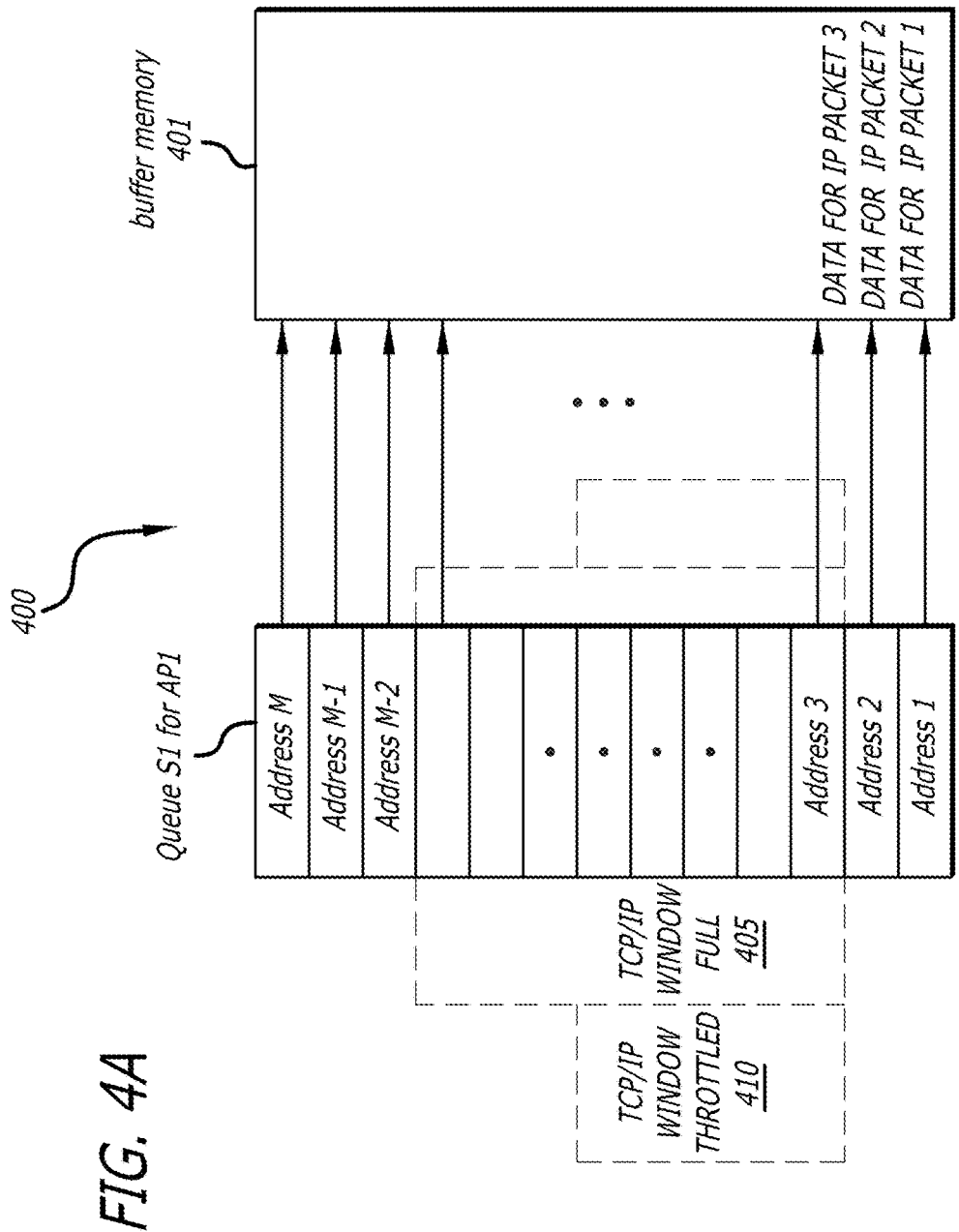
FIG. 4A is a conceptual diagram of a send queue management system on the sending server to avoid dropped data packets at the receiving server.

FIG. 4A is a conceptual diagram of a send queue management system 400 on the sending server 100B to avoid dropped data packets at the receiving server 250. For explanatory purposes, the send queue management system 400 shows only the send queue S1 (for application AP1) in relation to a buffer memory 401 on the sending server 100B. However, the description of features for send queue S1 is generally applicable to any queue having data packets to be sent to an application on the receiving server 250.

A send queue includes a list of addresses to data buffers to store a predetermined number of data packets to be sent. For example, send queue S1 includes a list of addresses to data buffers on a buffer memory 401 on the sending server 100B. The sending server 100B allocates a list of addresses 1 through address M. Each address points to a buffer location in the buffer memory 401 in the sending server 100B. For example, address 1 points to data for data packet 1; address 2 points to data for data packet 2; address 3 points to data for data packet 3, and so on.

Before a sending server reduces (e.g., before throttling) the transmit rate of data packets, the sending server may be sending a full transmit window 405 of data packets. A transmit window is the number of bytes that can be sent out by the sending server 100B before receiving an acknowledgement (ACK) data packet from the receiving server 250. The sending server 100B stores the data packets in the buffer memory 401 at locations spanning from address 3 to address M-3. Accordingly, the data packets stored at addresses 3 through M-3 are to be sent from the sending server 100B to application AP1 on the receiving server 250.

In order to reduce (e.g., throttle) the transmit rate of data packets in response to the ACK packet, the sending server 100B sends a throttled transmit window 410 of data packets to the receiving server 250. The throttled transmit window 410 includes fewer data packets and fewer bytes than that of the full transmit window 405. The sending server 100B stores the data packets in the buffer memory 401 at locations spanning from address 3 through address M-5. Accordingly, the data packets stored at addresses 1 through M-5 are available to be sent to application AP1 on the receiving server 250.

Figure 4B:
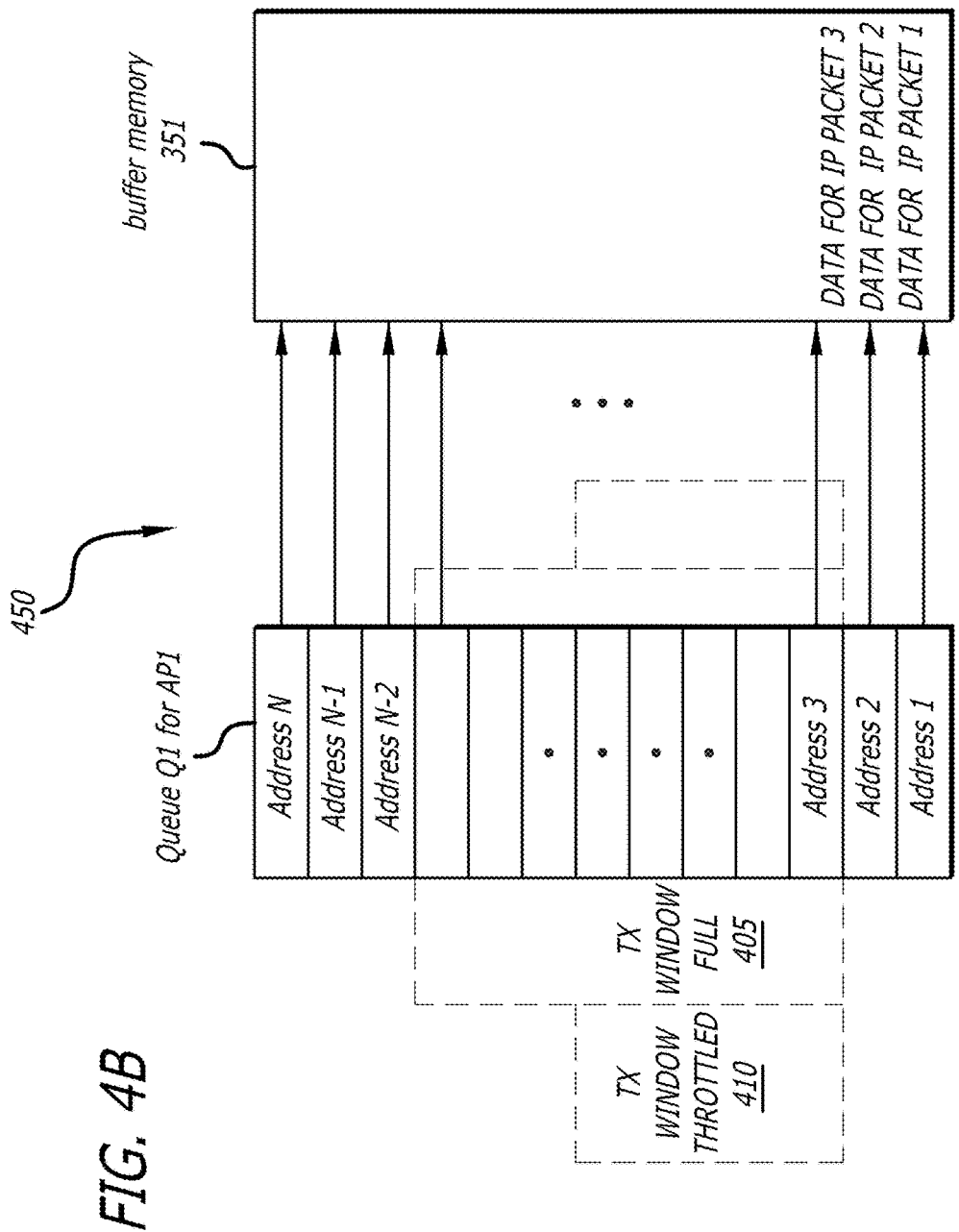
FIG. 4B is a conceptual diagram of a receive queue management system on the receiving server to avoid dropped data packets.

FIG. 4B is a conceptual diagram of a receive queue management system 450 on the receiving server 250 to avoid dropped data packets. For explanatory purposes, the receive queue management system 450 shows only the receive queue Q1 (for application AP1) in relation to the buffer memory 351 on the receiving server 250. However, the description of features for receive queue Q1 is generally applicable to each of the receive queues Q1-QN (see FIG. 3) respectively associated with each application AP1-APN.

A receive queue includes a list of addresses to data buffers to store a predetermined number of received data packets. For example, receive queue Q1 includes a list of addresses to data buffers on the buffer memory 351. The receiving server allocates a list of addresses 1 through address N. Each address points to a buffer location in the buffer memory 351 in the receiving server 250. For example, address 1 points to data for data packet 1; address 2 points to data for data packet 2; address 3 points to data for data packet 3, and so on.

Before the sending server 100B reduces (e.g., before throttling) the transmit rate of data packets, the receiving server may be receiving the full transmit window 405 of data packets from the sending server 100B. As described herein, a transmit (TX) window is the number of bytes that can be sent out by the sending server 100B before receiving an acknowledgement (ACK) data packet from the receiving server 250. The receiving server 250 stores the data packets in the buffer memory 351 at locations spanning from address 3 to address N-3. Accordingly, the data packets stored at addresses 3 through N-3 are available for application AP1 to process. As discussed with reference to FIGS. 2 and 3, if the application AP1 does not process the data packets fast enough (e.g., a threshold level is reached in receive queue Q1), then the receiving server sends an ACK packet (including an activated ECN echo bit) back to the sending server 100B.

After the sending server 100B reduces (e.g., after throttling) the transmit rate of data packets in response to the ACK packet, the receiving server 250 receives data packets numbering within the throttled transmit window 410 of data packets from the sending server 100B. The throttled transmit window 410 includes fewer data packets and fewer bytes than that of the full transmit window 405. Accordingly, the application AP1 is more likely to process all of data packets of the throttled transmit window 410 before the receive queue Q1 reaches a congestion threshold level. The receiving server 250 stores the data packets in the buffer memory 351 at locations spanning from address 3 through address N-6. Accordingly, the data packets stored at addresses 3 through N-6 are available for application AP1 to process. Again, if the application AP1 does not process the data packets fast enough (e.g., if a congestion threshold level is reached in receive queue Q1), then the receiving server 250 can send another ACK packet (including an activated ECN echo bit) back to the sending server. The receive queue management system 450 can continue in this manner, sending back an ACK packet with an activated ECN echo bit as necessary.

Figure 5A:
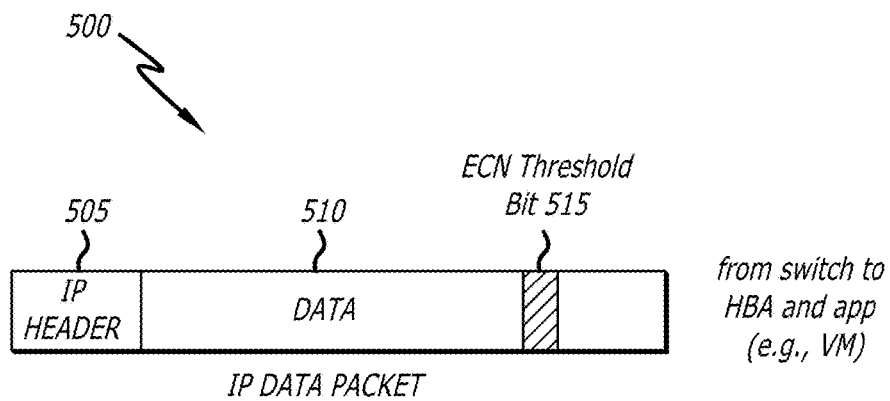
FIG. 5A is an example IP data packet that a switch/router sends to a network interface adapter.

FIG. 5A is an example data packet 500 that a switch/router sends to a network interface adapter. The data packet 500 includes a header 505 and a data field 510. The data packet 500 includes an ECN threshold bit 515. The ECN threshold bit 515 may be included as part of the header 505 of the packet 500. As discussed with reference to FIG. 1, a queue in a switch/router can become congested. In response, the switch/router can set the ECN threshold bit 515 in the data packet 500. With congestion at the switch/router, the switch/router sends the data packet 500 with the activated ECN threshold bit 515 to the receiving server to indicate that a sending server needs to slow a transmit rate.

Figure 5B:
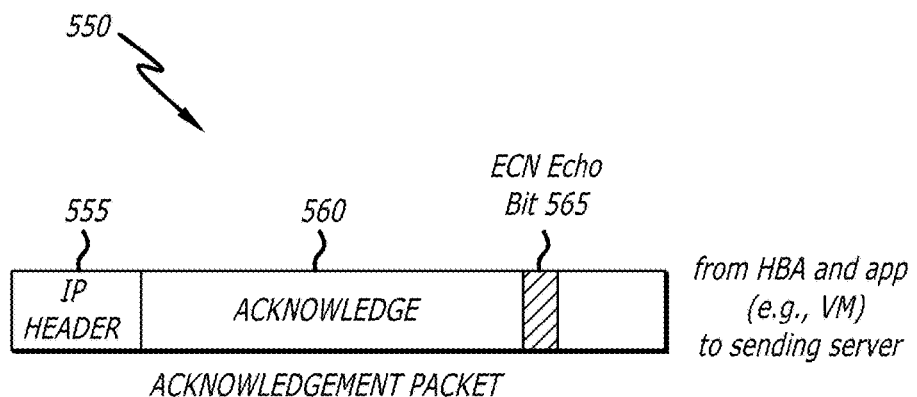
FIG. 5B is an example IP acknowledgement (ACK) packet that a receiving server sends back to a sending server.

FIG. 5B is an example acknowledgement (ACK) packet 550 that a receiving server can send back to a sending server to indicate congestion. The acknowledgement (ACK) packet 550 includes a header 555, and an acknowledge field 560. Alternatively, an acknowledgement bit may be set to indicate the packet 550 is an acknowledgment packet. The packet 550 further includes an ECN echo (ECE) bit or flag 565, typically a bit included as part of the header 555. The ECE bit or flag is set by the receiving server in the embodiments to indicate potential congestion in the receiving server before dropping packets.

As discussed with reference to FIG. 2, a queue at the receiving server can become congested. In response, the receiving server can set the ECN echo bit 565 in the acknowledgement (ACK) packet 550. The receiving server sends the IP acknowledgement (ACK) packet 550 with the activated ECN echo bit 565 back to the sending server to indicate that the sending server needs to slow a transmit rate.

In another embodiment, the receiving server sets the ECN echo bit 565 in response to receiving the activated ECN threshold bit 515 from a switch/router. In such a case, it is possible that both the switch/router and the receiving server are congested. For example, the receiving server may send a packet with an activated ECN echo bit 565 to the sending server and then immediately receive a packet with an activated ECN threshold bit 515 from the switch/router. The application executed by the server that is experiencing congestion waits until the end of the TCP acknowledgement window (e.g., 1 microsecond or some other time interval). The application then determines if the queue for the application is still congested. If yes, then the application sends another activated ECN echo bit 565 back to the sending server.

Figure 5C:
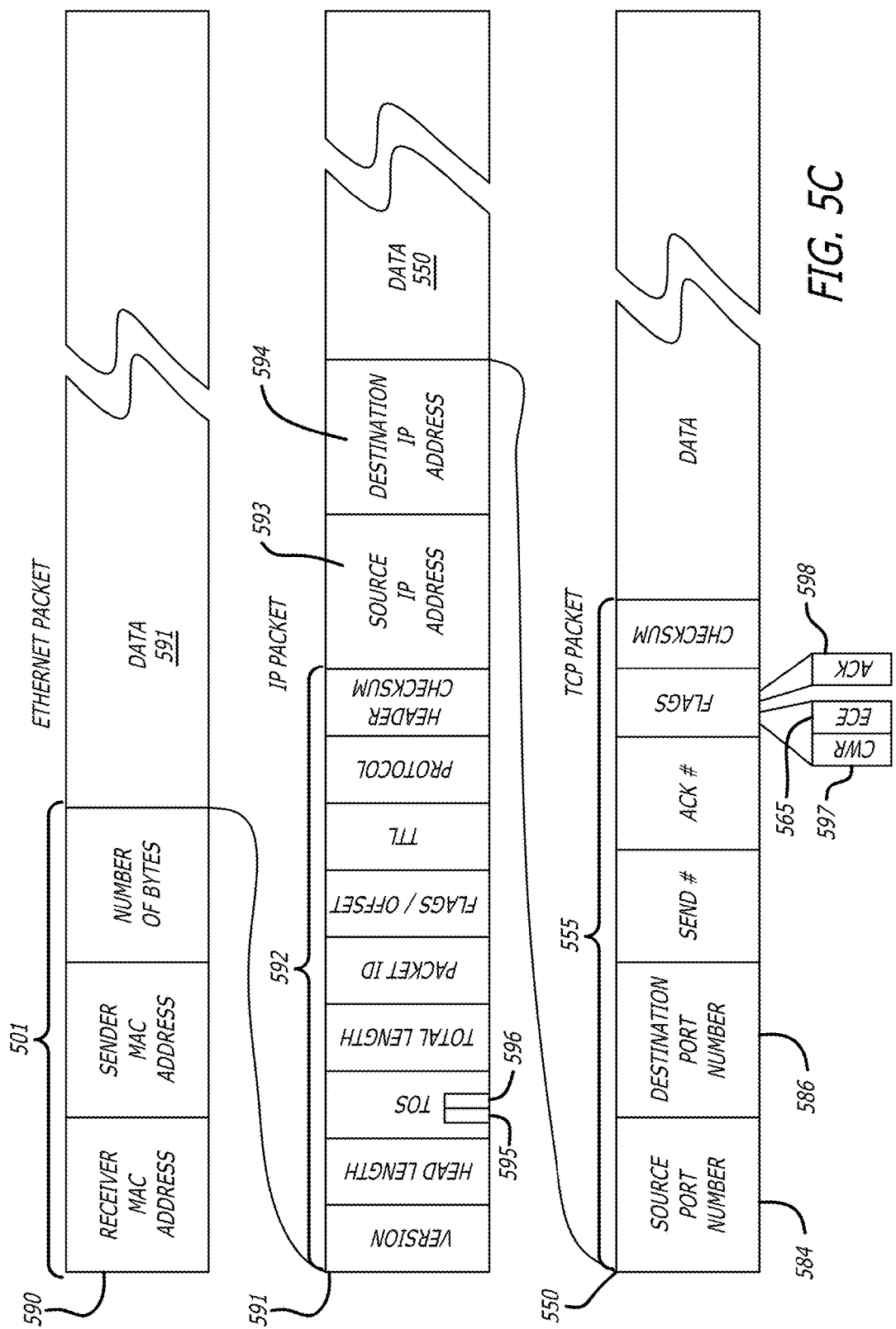
FIG. 5C illustrates details of the bit format of an Ethernet packet that includes an IP packet and the ECN bits in the header of the IP packet.

FIG. 5C illustrates a diagram of a format of an IPv4 Ethernet packet 590 with bits that can be set and cleared to support congestion notification. An IPv6 Ethernet packet can have similar bits. The Ethernet packet 590 includes an Ethernet header 501 and an internet protocol (IP) packet

591. The Ethernet header 501 may include a receiver mac address, a sender mac address, and the number of bytes in the IP packet 591 that follows.

The IP packet 591 includes, an IP header 592; a source IP address 593; a destination IP address 594, and a data field. The data field of the IP packet 591 may include a transmission control protocol (TCP) packet, a UDP packet, or an SCTP packet. FIG. 5C illustrates the TCP packet 550 in its data field.

The IP header field 592 of the IP packet 591 includes a version field, a header length field, a type of service (ToS) field, a total length field, a packet identifier, a time to live (TTL) field, a protocol field, and a header checksum. At the IP packet level, the ToS field of the IP header 592 includes two bits 595-596 of a bit-field (may be referred to as an ECN bit field) that are encoded (e.g., 00, 01, 10, 11) to indicate whether or not source/destination hardware is capable of supporting ECN communication and whether or not congestion is occurring. If incapable, a code (e.g., 00) for the bits 595-596 of the ECN bit field is communicated that indicates ECN communication is unsupported. Any other combination of code for the bits 595-596 of the ECN bit field (e.g., 01, 10, 11) indicates ECN communication is supported. When the ECN bit field is coded (e.g., 01, 10), it indicates that no congestion is being experienced in the communication channel or link between networked devices or servers. The bits 595-596 of the ECN bit field also includes a code that indicates actual congestion is being experienced (e.g., 11) in a communication channel or link between networked devices or servers. If an exclusive- or logical operation is performed on the bits 595-596 of the ECN bit field, an active high congestion signal (exclusive-nor logical operation for an active low congestion signal) can be logically generated to indicate congestion. Accordingly, the ECN bit field can signal that data packet congestion is being experienced in the communication channel or link between networked devices or servers. The IPv4 TOS field octet corresponds to the Traffic Class field octet in IPv6, and the ECN field is similarly defined.

The TCP packet 550 includes a TCP header 555 and optionally a data field. The TCP header field 555 of the TCP packet 550 includes a source port number 584, a destination port number 586, a send number, an acknowledgement number, a flags field, and a checksum field. The flags field of the IP header 505 includes ECN flags or bits, a Congestion Window Reduced (CWR) flag or bit 597 and the ECN-Echo (ECE) flag or bit 565, that may be set or cleared depending upon the condition of the communication channel.

Previously, the ECN-Echo (ECE) flag or bit 565 in the TCP header allowed the data receiver to inform a router/switch when a CE packet was received. Previously, the Congestion Window Reduced (CWR) flag or bit 597 in the TCP header allowed the router/switch to inform the receiver that a transmit congestion window was reduced. The CWR flag 597 from the router/switch enabled the receiver to determine when to stop setting the ECN-Echo bit or flag 565 in the acknowledgment packet. In the embodiments described herein, the ECN echo bit or flag 565 has greater functionality and instead indicates the potential for endpoint congestion in the receiver when set by the receiving server in the acknowledgment packet, without other congestion bits or flags being set in the received packets.

The flags field of the IP header 505 further includes an acknowledgement flag or bit 598 to indicate whether or not the packet is an acknowledgment packet. If the IP packet is a data packet, a data field 509 may be included. If the IP packet is an acknowledgement packet, the acknowledgment bit 595 is set to indicate an acknowledgement packet and the data field 509 may not be present.

Figure 6:
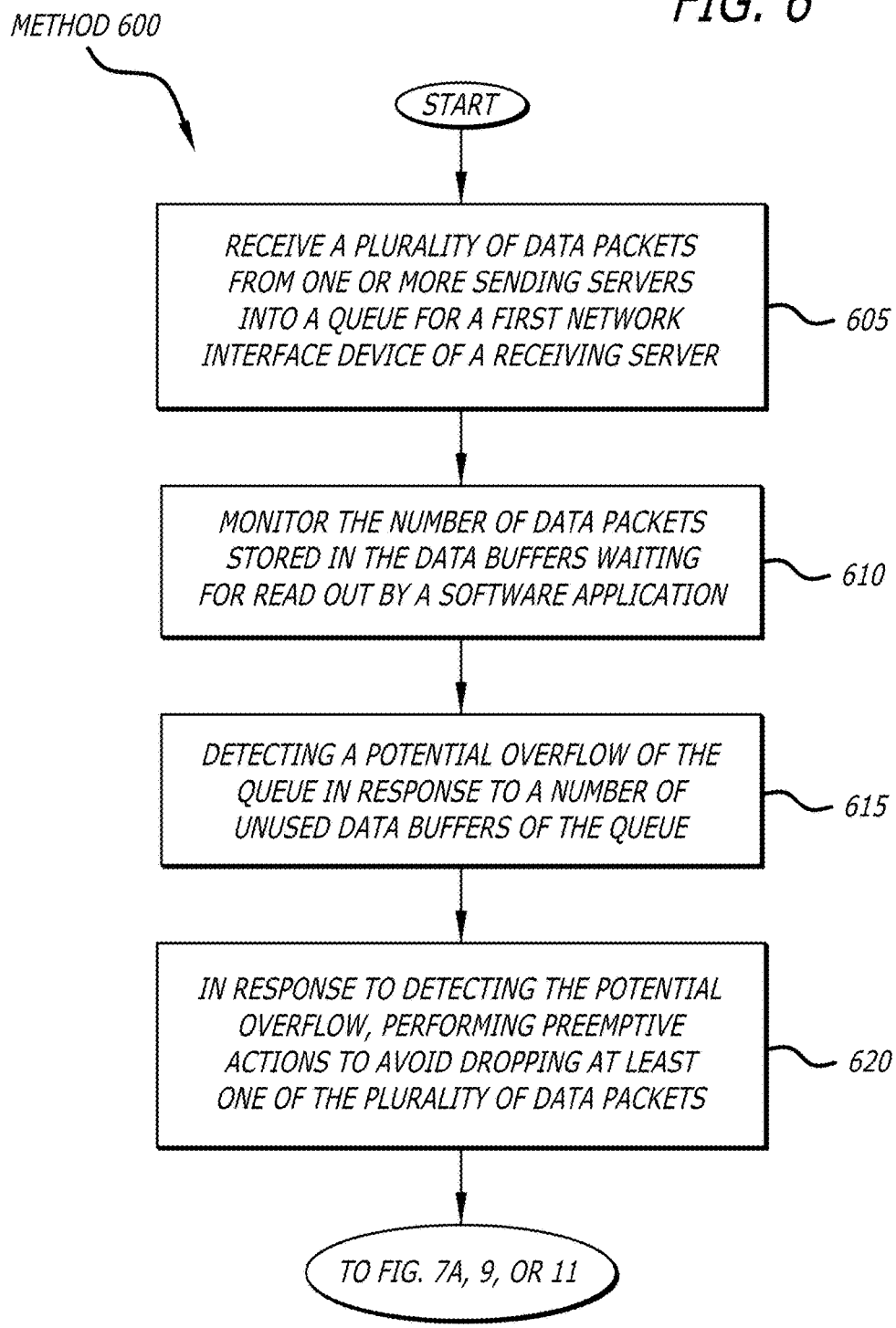
FIG. 6 is a flowchart of an example method for avoiding dropped data packets between computers coupled on a network.

FIG. 6 is a flowchart of an example method 600 for avoiding dropped data packets between computers coupled on a network. In one embodiment, one or more devices on the receiving server 250 of FIG. 2 can carry out the method 600.

At an action 605, the receiving server 250 receives a plurality of data packets from one or more sending servers into a queue for a first network interface device of a receiving server. The receiving server 250 may have multiple queues for multiple applications. Each queue is assigned to a particular application (e.g., virtual machine) running on the receiving server.

At an action 610, the receiving server 250 monitors the number of data packets stored in the data buffers waiting for read out by a software application. For example, the receiving server 250 monitors the number of unused buffers for the queue. Alternatively, the receiving server 250 monitors the percentage of unused data buffers based on the total number buffers for the queue. Alternatively, the receiving server 250 monitors the number occupied data buffers in the data buffer. Alternatively, the receiving server 250 monitors the percentage of occupied data buffer based on the total number buffers for the queue.

At an action 615, the receiving server 250 detects a potential overflow of the queue in response to a number of unused data buffers of the queue. For example, the receiving server 250 detects the queue has dropped to a threshold level of unused buffers. Alternatively, the receiving server 250 detects that the queue has risen to a threshold level of occupied buffers.

Figure 11:
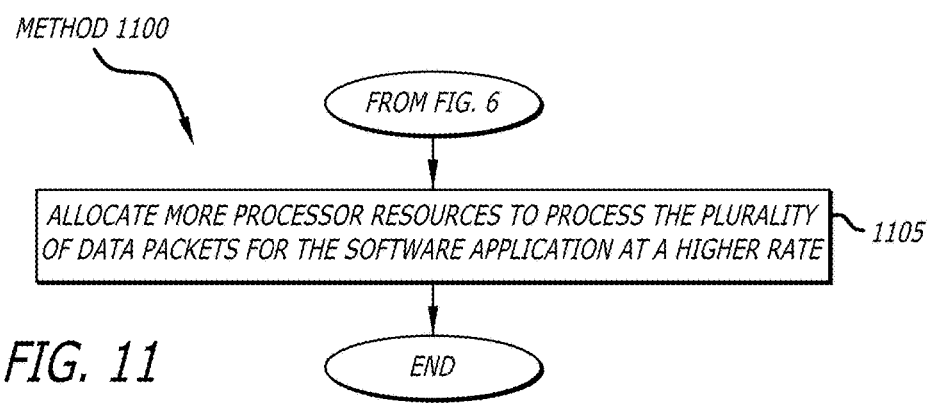
FIG. 11 is a flowchart of an example method for performing preemptive actions to avoid dropping data packets.

At an action 620, in response to detecting the potential overflow, the receiving server 250 performs preemptive actions to avoid dropping at least one of the plurality of data packets. The preemptive actions may include at least one of the following: return an explicit congestion notification (ECN) to the offending sending server (FIG. 7A); increase queue depth for a congested application running on the receiving server (FIG. 9); and/or increase processor resources for the application running on the receiving server (FIG. 11).

The receiving server 250 may repeat the method 600 as necessary. For example, demands for network bandwidth are constantly changing. Accordingly, the rates at which the queues become congested are constantly changing. Thus, the receiving server 250 can constantly run the method 600 in a real world runtime environment. Other actions and/or details are discussed with reference to the figures and may be a part of the method 600, depending on the implementation.

Figure 7A:
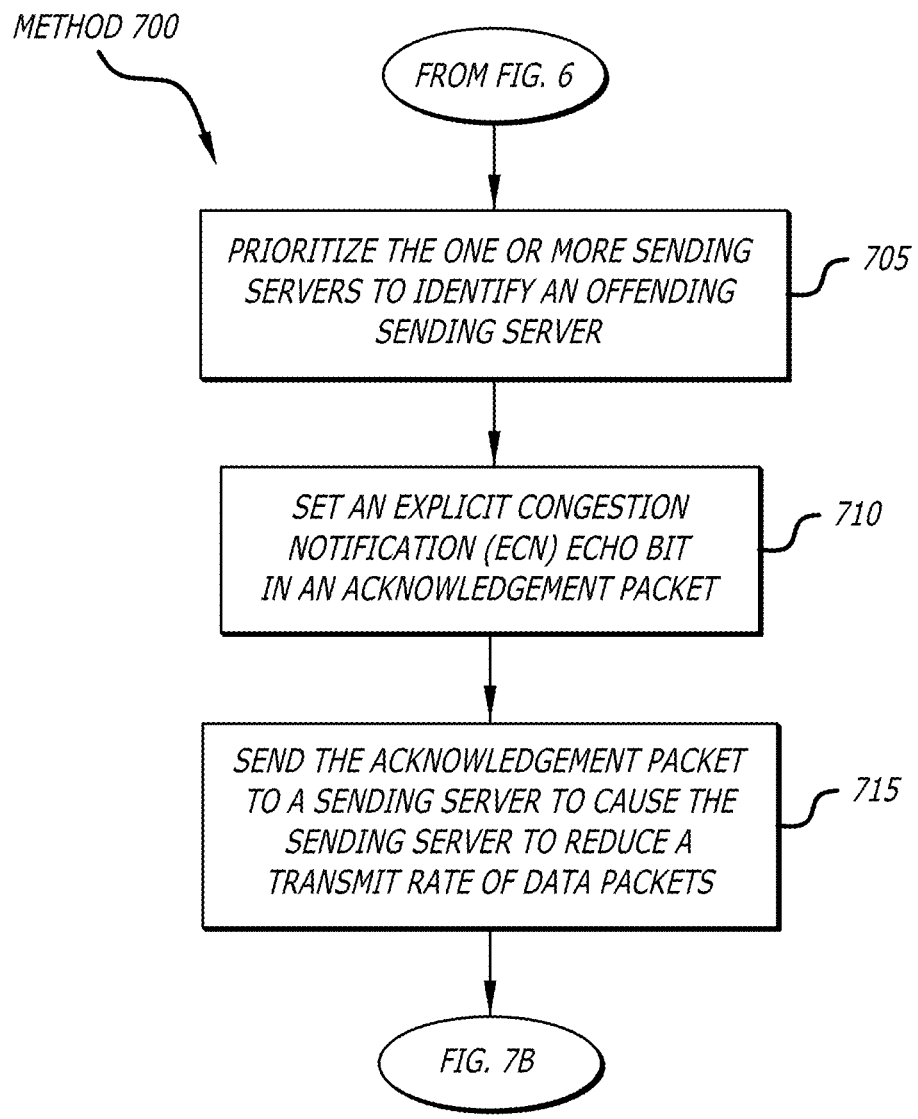
FIG. 7A is a flowchart of an example method for performing preemptive actions to avoid dropping data packets.

FIG. 7A is a flowchart of an example method 700 for performing preemptive actions to avoid dropping data packets. In one embodiment, the receiving server 250 of FIG. 2 can carry out the method 700. The method 700 proceeds from the action 620 of FIG. 6.

At an action 705, the receiving server 250 prioritizes the one or more sending servers to identify an offending sending server. For example, the receiving server 250 identifies the offending sending server that has the most congested queues.

At an action 710, the receiving server 250 sets an explicit congestion notification (ECN) echo bit in an acknowledgement (ACK) packet without being prompted by the switch/router 160 (e.g., without receiving an ECN threshold bit 515 from the switch/router 160. At an action 715, the receiving server 250 sends the acknowledgement (ACK) packet to a sending server to cause the sending server to reduce a transmit rate of data packets. The sending server responds by reducing the transmit rate by reducing a size of a transmission window including a number of data packets that are set to be transmitted to the receiving server.

The receiving server 250 may repeat the method 700 as necessary. Other actions and/or details are discussed with reference to the figures and may be a part of the method 700, depending on the implementation.

Figure 7B:
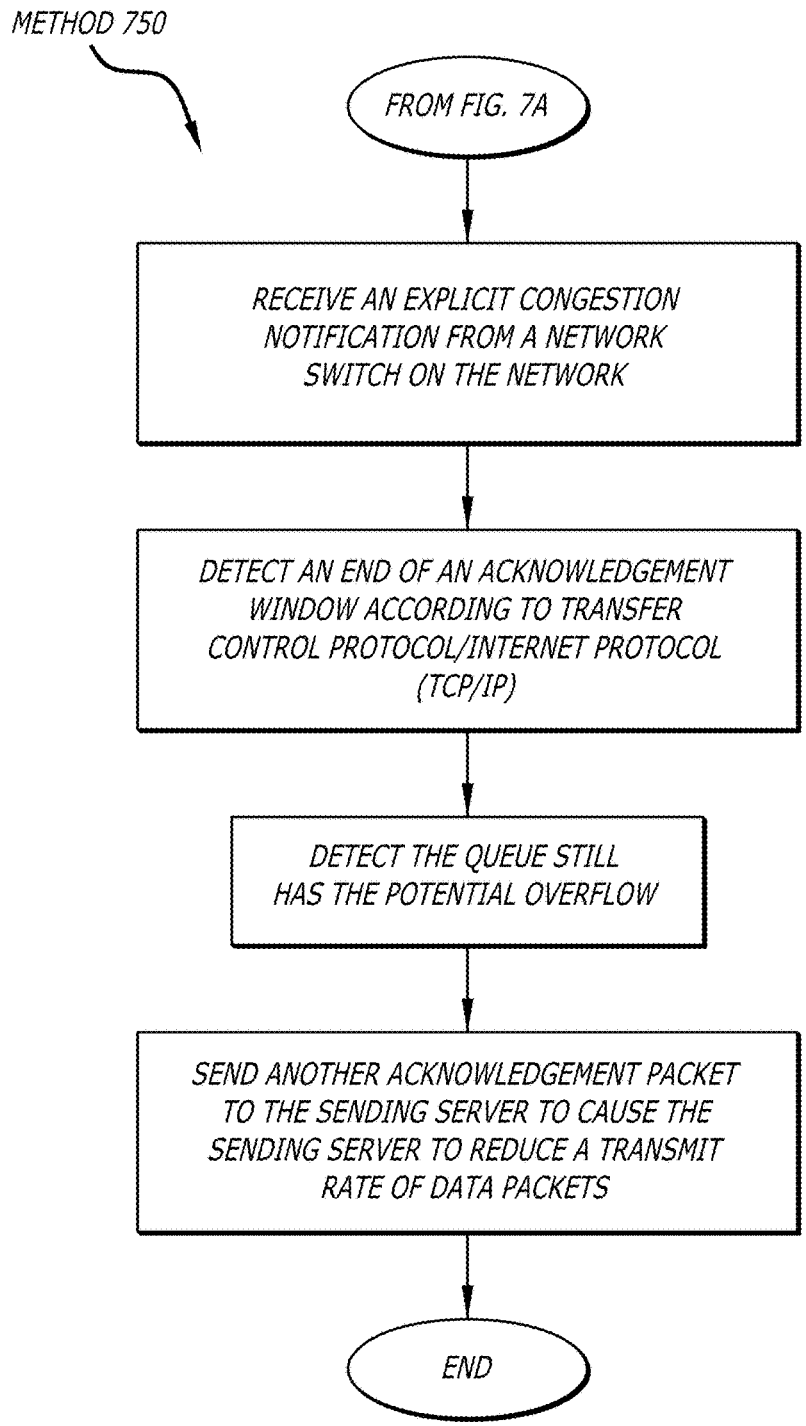
FIG. 7B is a flowchart of an example method that continues from the method of FIG. 7A.

FIG. 7B is a flowchart of an example method 750 that continues from the method 700 of FIG. 7A. In one embodiment, the receiving server 250 of FIG. 2 can carry out the method 750. The method 750 proceeds from the action 755 of FIG. 7B.

At an action 755, the receiving server receives an explicit congestion notification from a network switch on the network. For example, the receiving server receives an IP data packet having an activated ECN threshold bit.

At an action 760, the receiving server detects an end of an acknowledgement window according to transfer control protocol/Internet protocol (TCP/IP). The acknowledgement window is the number of data packets that the receiving server processes before the receiving server sends another acknowledgment to the sending server.

At an action 765, the receiving server detects the queue still has the potential overflow. For example, the receiving server detects again that the queue has dropped to a threshold level of unused buffers. Alternatively, the receiving server detects again that the queue has risen to a threshold level of occupied buffers.

At an action 770, the receiving server sends another acknowledgement (ACK) packet to the sending server to cause the sending server to reduce a transmit rate of data packets. The sending server responds by further reducing the transmit rate by reducing a size of a transmission window including a number of data packets that are set to be transmitted to the receiving server.

The receiving server 250 may repeat the method 750 as necessary. Other actions and/or details are discussed with reference to the figures and may be a part of the method 750, depending on the implementation.

Avoiding Dropped Data Packets by Increasing Queue Depth

Figure 8:
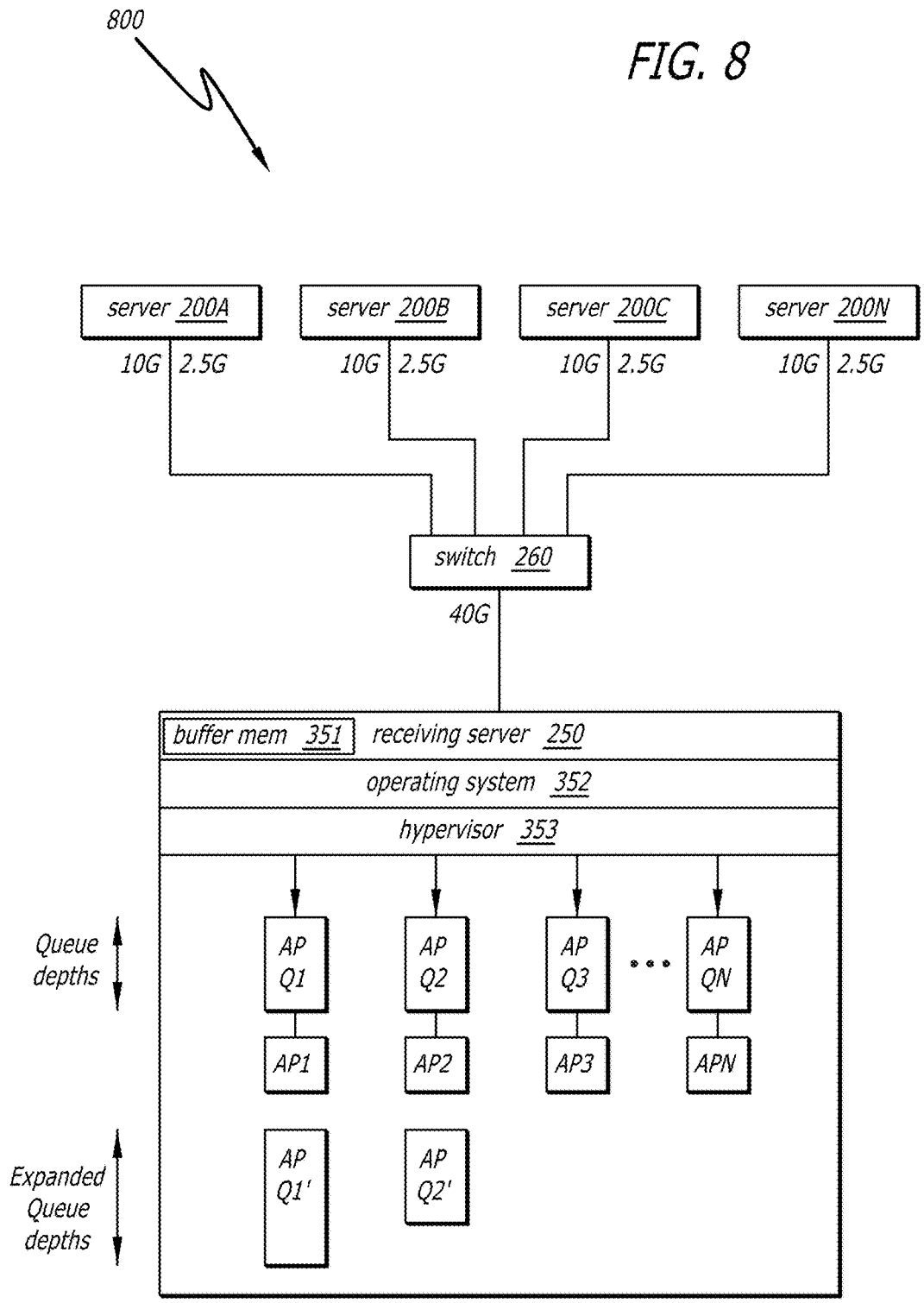
FIG. 8 is a conceptual diagram of yet another example system for avoiding dropped data packets by using the receiving adapter (e.g., network interface adapter).

FIG. 8 is a conceptual diagram of yet another example system 800 for avoiding dropped data packets by using the receiving adapter 156 (e.g., network interface adapter). FIG. 8 is provided to show more details of active queue management carried out on the receiving server 250. For simplicity, devices introduced for FIGS. 1 through 7 are not reintroduced for FIG. 8.

The receiving server 250 monitors the number of data packets each application AP1-APN store in the buffer memory 315 by monitoring the depth of each queue Q1-QN. Instead of dropping packets, the receiving server 250 can perform active queue management and initiate preemptive actions to prevent dropped packets. For example, the preemptive actions include monitoring a queue depth of each queue Q1-QN and detecting a potential overflow (e.g., depth of a queue has reached a threshold level).

The receiving server 250 can calculate a threshold level for a potential overflow based on the size of each queue reserved for each application AP1-APN. Consider, for example, four sending servers share a 40-Gbit link through a network interface adapter (e.g., receiving adapter 257 of FIG. 2) on the receiving server 250. The receiving server 250 may initially allocate 10-Gbit of buffer memory 351 for each queue Q1-QN. Queues Q1 and Q2, for example, may drop to a predetermined threshold level of unused buffers (e.g., 30% unused buffers or some other percentage). Reaching the threshold level represents a potential overflow.

In response to the potential overflow, the receiving server 250 increases the queue depth of queues Q1 and Q2. In particular, the receiving server 250 makes more buffer locations in the buffer memory 351 available to queue Q1. The receiving server 250 increases queue Q1 by an expanded queue depth Q1'. Likewise, the receiving server 250 makes more buffer locations in the buffer memory 351 available to Q2. The receiving server 250 increases queue Q2 by an expanded queue depth Q2'.

Expanded queue depths are not necessarily equal. For example, the size of expanded queue depth Q1' is not necessarily equivalent to the size of expanded queue depth Q2'. The receiving server 250 can apportion the increased queue depth as needed. For example, if queue Q1 is 20% more congested than queue Q2, then the receiving server 250 can set the expanded queue depth Q1' to be 20% larger than the expanded queue depth Q2'. The receiving server 250 can also borrow buffer space in the buffer memory 315 from an application Q1-QN that is relatively less active.

Figures 9, 10A:
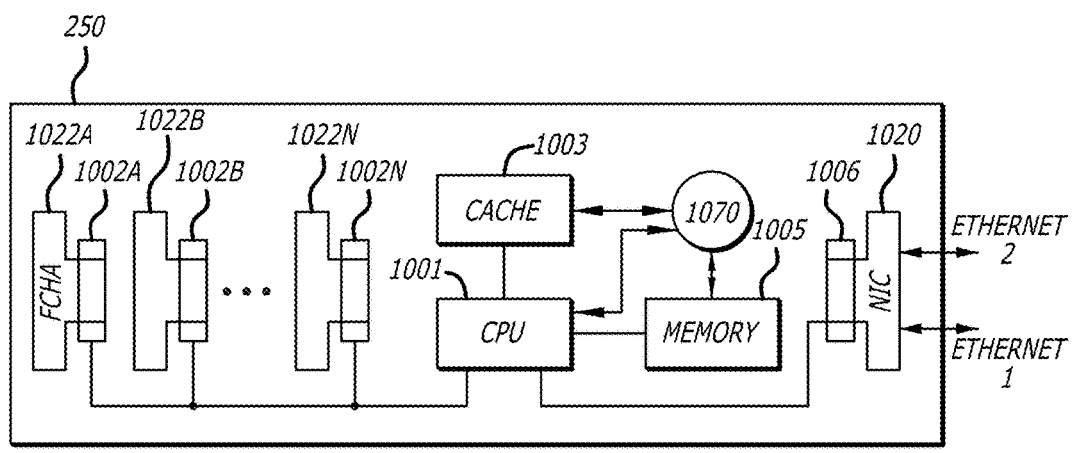
FIG. 9 is a flowchart of an example method for performing preemptive actions to avoid dropping data packets.
FIG. 10A is a block diagram showing a computer apparatus implementation of the receiving server of FIG. 2.

FIG. 9 is a flowchart of an example method 900 for performing preemptive actions to avoid dropping data packets. In one embodiment, the receiving server 250 of FIG. 2 can carry out the method 900. The method 900 proceeds from the action 620 of FIG. 6.

At an action 905, the receiving server 250 allocates more addresses to more buffers for the queue to enable the application to store more data packets. For example, the receiving server 250 makes more buffer locations in the buffer memory 351 available to queue Q1.

The receiving server 250 may repeat the method 900 as necessary. Other actions and/or details are discussed with reference to the figures and may be a part of the method 900, depending on the implementation.

Avoiding Dropped Data Packets by Increasing Processor Resources

Potential data packet losses can be due to insufficient processor resources available to the congested application. Insufficient resources are a common occurrence for virtualized servers running with resources that are specifically constrained (e.g., constrained by the hypervisor 353). In addition to the preemptive actions described with reference to FIGS. 3 through 9, the congested application communicating with the operating system 352 can initiate further preemptive actions to increase the assigned processor resources for the congested application. In a case where the congested application is a virtual machine (e.g., virtual server), the congested application can initiate communications with the hypervisor 353 to increase the assigned processor resources for the congested application. The increased resources enable the receiving server 250 to process received data packets at a higher rate. Accordingly, the receiving server avoids dropped data packets. Further, the sending server (e.g., server 100B) avoids throttling data packet transmits.

FIG. 10A is a block diagram showing a computer apparatus implementation of the receiving server 250 of FIG. 2. The receiving server 1012 includes one or more Fibre Channel host bus adapters (FCHA) 1022A-1022N operatively coupled with sockets 1002A-1002N and a high speed Ethernet card 1020 operatively coupled with socket 1006 for data communications over various types of interfaces with various communication protocols. The high speed Ethernet card 1020 may communicate, for example, with networked storage devices using a Fibre Channel over Ethernet (FCoE) communication protocol, or another protocol. The high speed Ethernet card 1020 may communicate with client computers, server computers, or other networked computer devices using an Ethernet communication protocol, for example.

The one or more Fibre Channel host bus adapters (FCHA) 1022A-1022N may communicate with networked storage devices using a Fibre Channel (FC) communication protocol, such as small computer system interface (SCSI). The receiving server 1012 further includes one or more processors 1001, a cache memory 1003, and scratch pad memory 1005 coupled together as shown. Each server 1012 may further include a larger storage device 1070, such as a hard disk drive or a solid state storage drive (SSD) to store software instructions of software drivers and software applications for execution by the one or more processors to perform various functions described herein. The one or more processors 1001 may be multi-processors having multiple processor cores in one package that can be assigned to certain server functions. A portion of the cache memory 1003 may be allocated and assigned to each processor 1001 for use. The cache memory 1003 may be a flash based cache memory (FBC) that is non-volatile to retain is data in the event of power down or a catastrophic power failure.

Figure 10B:
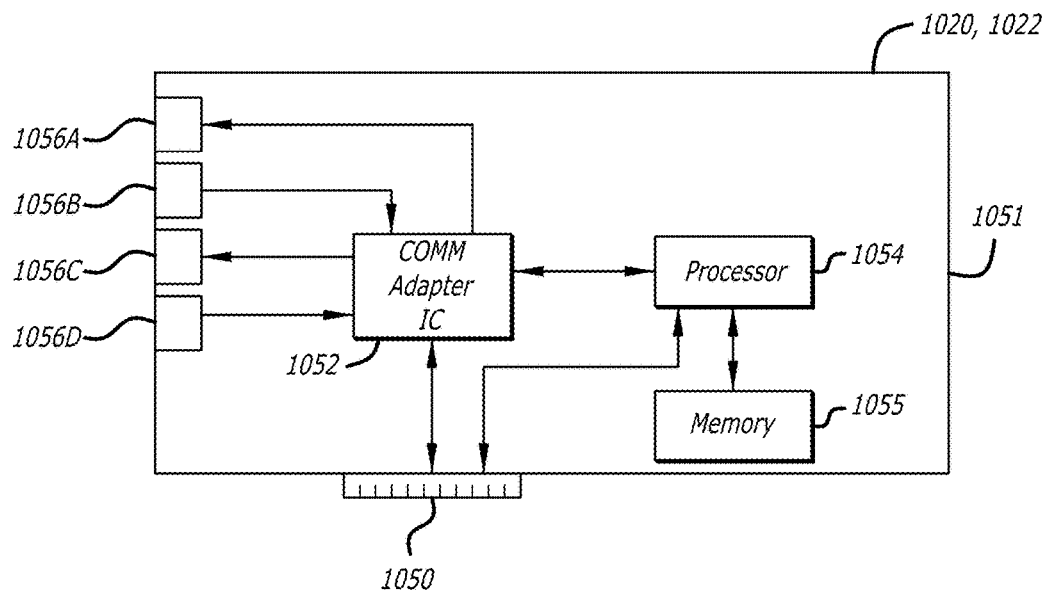
FIG. 10B is a block diagram of a network interface adapter for a server.

Referring now to FIG. 10B, a block diagram of a host bus adapter card 1020, 1022 is shown. The host bus adapter card 1020, 1022 is an instance of the high speed Ethernet card 1020 and the Fibre Channel host bus adapters (FCHA) 1022A-1022N. The host bus adapter 1020, 1022 includes a communication adapter 1052, a processor 1054, and a memory device 1055 mounted to a printed circuit board (PCB) 1051 and coupled in communication together by a plurality of wire traces of the PCB. The communication adapter 1052 and the processor 1054 are in further communication with an edge connector 1050 of the adapter card 1020, 1022.

The host bus adapter card 1020, 1022 is plugged into the server 250 via the edge connector 1050 and the one or more sockets 1002A-1002N, 1006. The host bus adapter card 1020, 1022 includes one or more physical connectors 1056A-1056D mounted to the PCB 1051 and coupled in communication to the communication adapter IC 1052. The one or more physical connectors 1056A-1056D received one or more plugs of cables that are coupled to the computer network. Accordingly, the host bus adapter card 1020, 1022 couples the server in communication with the computer network and other networked devices, such as the sending server.

The queues associated with the buffer memory and the application executed by a computer may be stored in the memory 1055 under control of the processor 1054. The processor 1054 executes instructions of a software driver to control the queues, set ECN bits of IP packets, and throttle the transmission of packets sent by a sending server to the receiving server. The processor 1054 effectively controls the transmit windows 405, 410 shown in FIG. 4B.

Referring now to FIG. 11, a flowchart of an example method 1100 is illustrated for performing preemptive actions to avoid dropping data packets. In one embodiment, the receiving server 250 of FIG. 2 can carry out the method 1100. The method 1100 proceeds from the action 620 of FIG. 6.

At an action 1105, the receiving server 250 allocates more processor resources to process the plurality of data packets for the software application at a higher rate. For example, the receiving server 250 allocates more of the resources of the CPU 1001 to process the plurality of data packets.

The receiving server 250 may repeat the method 1100 as necessary. Other actions and/or details are discussed with reference to the figures and may be a part of the method 1100, depending on the implementation.

When implemented in software, the elements of the embodiments are essentially the code segments or instructions to perform the functional tasks described herein. The code segments or instructions are executable by a processor, such as processor 1001 of FIG. 10 and can be stored in a storage device or a non-transitory processor readable storage medium, such as memory 1005 of FIG. 10, awaiting execution. The processor readable storage medium may include any medium that can store information. Examples of the processor readable storage medium include an electronic circuit, a semiconductor memory device, a read only memory (ROM), a flash memory, an erasable programmable read only memory (EPROM), a floppy diskette, a CD-ROM, an optical disk, and/or a hard disk. The code segments or instructions may be downloaded via computer networks (e.g., Internet, Intranet, etc.) into the processor readable storage medium.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed embodiments are limited only by patented claims that follow below.

What is claimed is:

1. A method to avoid dropping data packets between computers in communication together over a network, the method comprising:
   receiving a plurality of data packets from one or more sending servers into a receive queue for a first network interface device of a receiving server, wherein the receive queue includes addresses to data buffers to store a predetermined number of data packets;
   monitoring the number of data packets stored in the data buffers waiting for read out by a software application;
   detecting a potential overflow of the receive queue in response to a number of unused data buffers of the receive queue dropping to a threshold level of unused data buffers, wherein the threshold level comprises a non-zero number of unused data buffers; and
   in response to detecting the potential overflow, performing preemptive actions to avoid dropping at least one of the plurality of data packets, the preemptive actions comprising:
   setting an explicit congestion notification ("ECN") echo bit in an acknowledgement ("ACK") packet; and
   sending the ACK packet to a sending server to cause the sending server to reduce a transmit rate of data packets.

2. The method of claim 1, wherein the preemptive actions further comprise:

prior to setting the ECN bit in the ACK packet, identifying the sending server by determining which sending server of the one or more sending servers has a greater number of congested queues.

3. The method of claim 2, wherein the preemptive actions further comprise:
prioritizing the one or more sending servers.

4. The method of claim 1, wherein the preemptive actions further comprise:
receiving an ECN from a network switch on the network;
detecting an end of an acknowledgement window according to transfer control protocol/Internet protocol (TCP/IP);
detecting the receive queue still has the potential overflow; and
in response to detecting the queue still has the potential overflow, sending another ACK packet to the sending server to cause the sending server to further reduce the transmit rate of data packets.

5. The method of claim 1, wherein in response to receiving the ACK packet, the sending server reduces the transmit rate by reducing a size of a transmission window of a transmit queue including a number of data packets that are set to be transmitted to the receiving server.

6. The method of claim 1, wherein the preemptive actions further comprise:
allocating more addresses to more buffers for the queue to enable the software application to store more data packets.

7. The method of claim 1, wherein the preemptive actions further comprise:
allocating more processor resources to process the plurality of data packets for the software application at a higher rate.

8. The method of claim 1, wherein the threshold level indicates data packets for the software application are not being processed fast enough.

9. A system for avoiding dropping data packets between computers in communication together over a network, the system comprising:
a processor to execute instructions; and
a storage device coupled to the processor, the storage storing instructions for execution by the processor to cause the processor to perform:
receiving a plurality of data packets from one or more sending servers into a receive queue for a first network interface device of a receiving server, wherein the receive queue includes addresses to data buffers to store a predetermined number of data packets;
monitoring the number of data packets stored in the data buffers waiting for read out by a software application;
detecting a potential overflow of the receive queue in response to a number of unused data buffers associated with the received queue dropping to a threshold level of unused data buffers, wherein the threshold level comprises a non-zero number of unused data buffers; and
in response to detecting the potential overflow, performing preemptive actions to avoid dropping at least one of the plurality of data packets, the preemptive actions comprising:
setting an explicit congestion notification ("ECN") echo bit in an acknowledgement ("ACK") packet; and
sending the ACK packet to a sending server to cause the sending server to reduce a transmit rate of data packets.

10. The system of claim 9, wherein the preemptive actions further comprise:
prior to setting the ECN bit in the ACK packet, identifying the sending server by determining which sending server of the one or more sending servers has a greater number of congested queues.

11. The system of claim 10, wherein the preemptive actions comprise:
prioritizing the one or more sending servers.

12. The system of claim 9, wherein the preemptive actions further comprise:
receiving an explicit congestion notification from a network switch on the network;
detecting an end of an acknowledgement window according to transfer control protocol/Internet protocol (TCP/IP);
detecting the receive queue still has the potential overflow; and
in response to detecting the receive queue still has the potential overflow, sending another acknowledgement (ACK) packet to the sending server to cause the sending server to further reduce the transmit rate of data packets.

13. The system of claim 9, wherein in response to receiving the acknowledgement (ACK) packet, the sending server reduces the transmit rate by reducing a size of a transmission window including a number of data packets that are set to be transmitted to the receiving server.

14. The system of claim 9, wherein the preemptive actions comprise:
allocating more addresses to more buffers for the receive queue to enable the software application to store more data packets.

15. The system of claim 9, wherein the preemptive actions comprise:
allocating more processor resources to process the plurality of data packets for the software application at a higher rate.

16. A computer-readable product for avoiding dropping data packets between computers in communication together over a network, the computer-readable product including a non-transitory computer-readable storage medium storing instructions comprising:
receiving a plurality of data packets from one or more sending servers into a receive queue for a first network interface device of a receiving server, wherein the receive queue includes addresses to data buffers to store a predetermined number of data packets;
monitoring the number of data packets stored in the data buffers waiting for read out by a software application;
detecting a potential overflow of the receive queue in response to a number of unused data buffers of the queue dropping to a threshold level of unused data buffers, wherein the threshold level comprises a non-zero number of unused data buffers; and
in response to detecting the potential overflow, performing preemptive actions to avoid dropping at least one of the plurality of data packets, the preemptive actions comprising:
setting an explicit congestion notification ("ECN") echo bit in an acknowledgement ("ACK") packet; and
sending the ACK packet to a sending server to cause the sending server to reduce a transmit rate of data packets.

17. The computer-readable product of claim 16, wherein the preemptive actions further comprise:

prior to setting the ECN bit in the ACK packet, identifying the sending server by determining which sending server of the one or more sending servers has a greater number of congested queues.

18. The computer-readable product of claim 17, wherein the preemptive actions further comprise:
prioritizing the one or more sending servers.

19. The computer-readable product of claim 16, wherein the preemptive actions further comprise:
receiving an explicit congestion notification from a network switch on the network;
detecting an end of an acknowledgement window according to transfer control protocol/Internet protocol (TCP/IP);
detecting the receive queue still has the potential overflow; and
in response to detecting the receive queue still has the potential overflow, sending another acknowledgement (ACK) packet to the sending server to cause the sending server to reduce a transmit rate of data packets.

20. The computer-readable product of claim 16, wherein in response to receiving the acknowledgement (ACK) packet, the sending server reduces the transmit rate by reducing a size of a transmission window of a transmit queue including a number of data packets that are set to be transmitted to the receiving server.

21. The computer-readable product of claim 16, wherein the preemptive actions further comprise:
allocating more addresses to more buffers for the queue to enable the software application to store more data packets.

22. The computer-readable product of claim 16, wherein the preemptive actions further comprise:
allocating more processor resources to process the plurality of data packets for the software application at a higher rate.

* * * * *